United States Patent [19]
Heithecker et al.

[11] 3,823,251
[45] July 9, 1974

[54] ELECTRICAL CONNECTOR FOR INTERIOR WALL PANELS

[75] Inventors: Gary Heithecker; Melvin R. Loseke; Joe Ferguson, all of Grapevine, Tex.

[73] Assignee: Mesco Metal Buildings Corporation, Grapevine, Tex.

[22] Filed: June 12, 1972

[21] Appl. No.: 261,743

[52] U.S. Cl. .................................. 174/48, 52/221
[51] Int. Cl. ............................................. H02g 3/28
[58] Field of Search .......... 174/48, 49; 52/220, 221, 52/242, 270, 287

[56] References Cited
UNITED STATES PATENTS

| | | | |
|---|---|---|---|
| 2,125,136 | 7/1938 | Trojanowski | 52/220 X |
| 2,721,471 | 10/1955 | Nelsson et al. | 52/221 X |
| 3,377,756 | 4/1968 | Polhamus | 174/48 X |

Primary Examiner—J. V. Truhe
Assistant Examiner—David A. Tone
Attorney, Agent, or Firm—Howard E. Moore; Gerald G. Crutsinger

[57] ABSTRACT

An interior wall panel for buildings wherein a sheet has spaced hollow channels formed therein to receive electrical wires, switches and outlet box receptacles. Resilient clips are secured in each channel adjacent opposite ends thereof and adjacent opposite sides of switches and electrical outlet boxes disposed therein. Elongated filler strips have projections thereon disconnectably secured to the clips, said filler strips bridging the channel in the sheet material and abutting with electrical switches and outlet boxes such that surfaces of a sheet, filler strip, electrical switch covers and outlet box covers substantially lie in a common plane.

8 Claims, 13 Drawing Figures

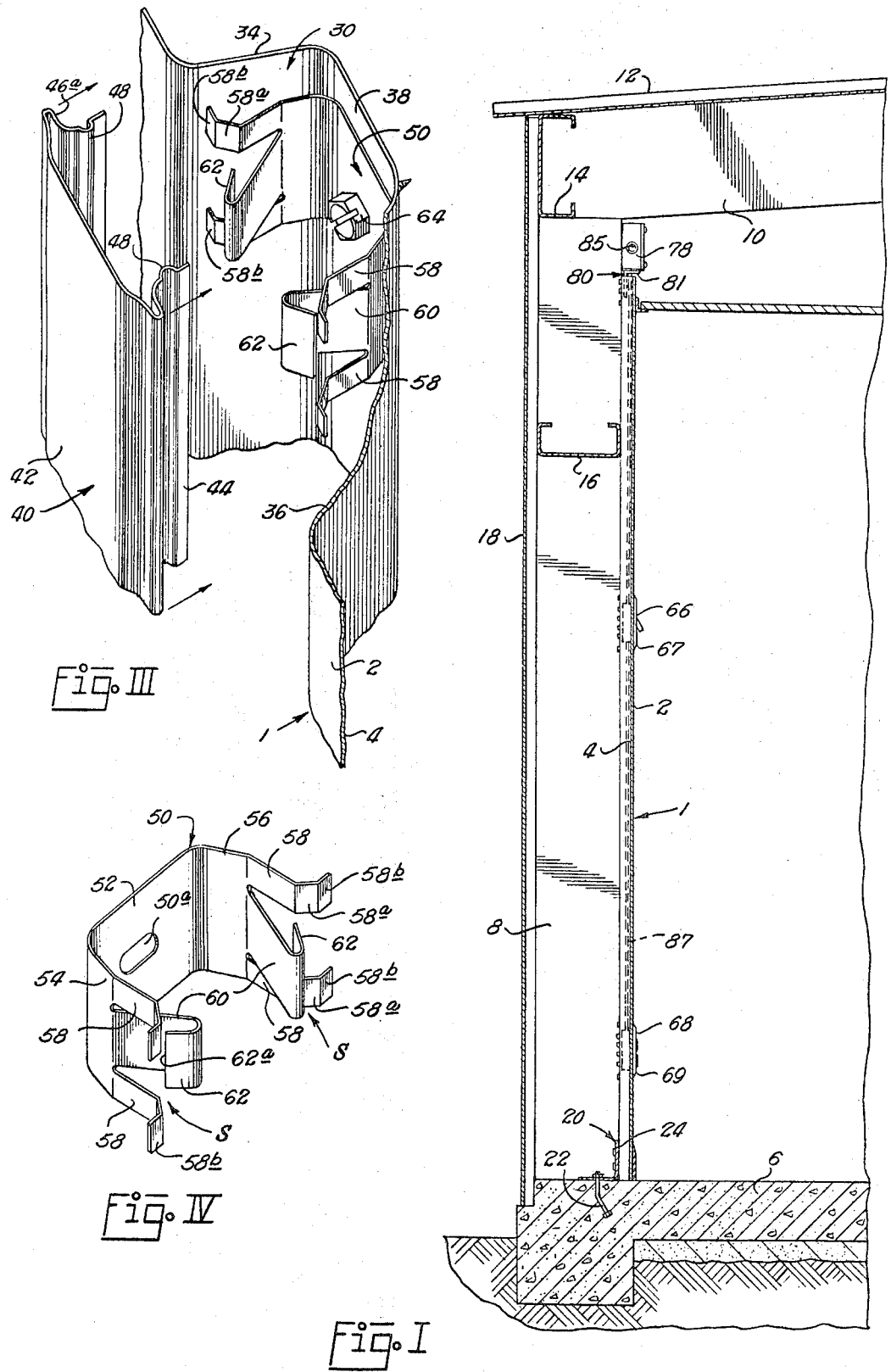

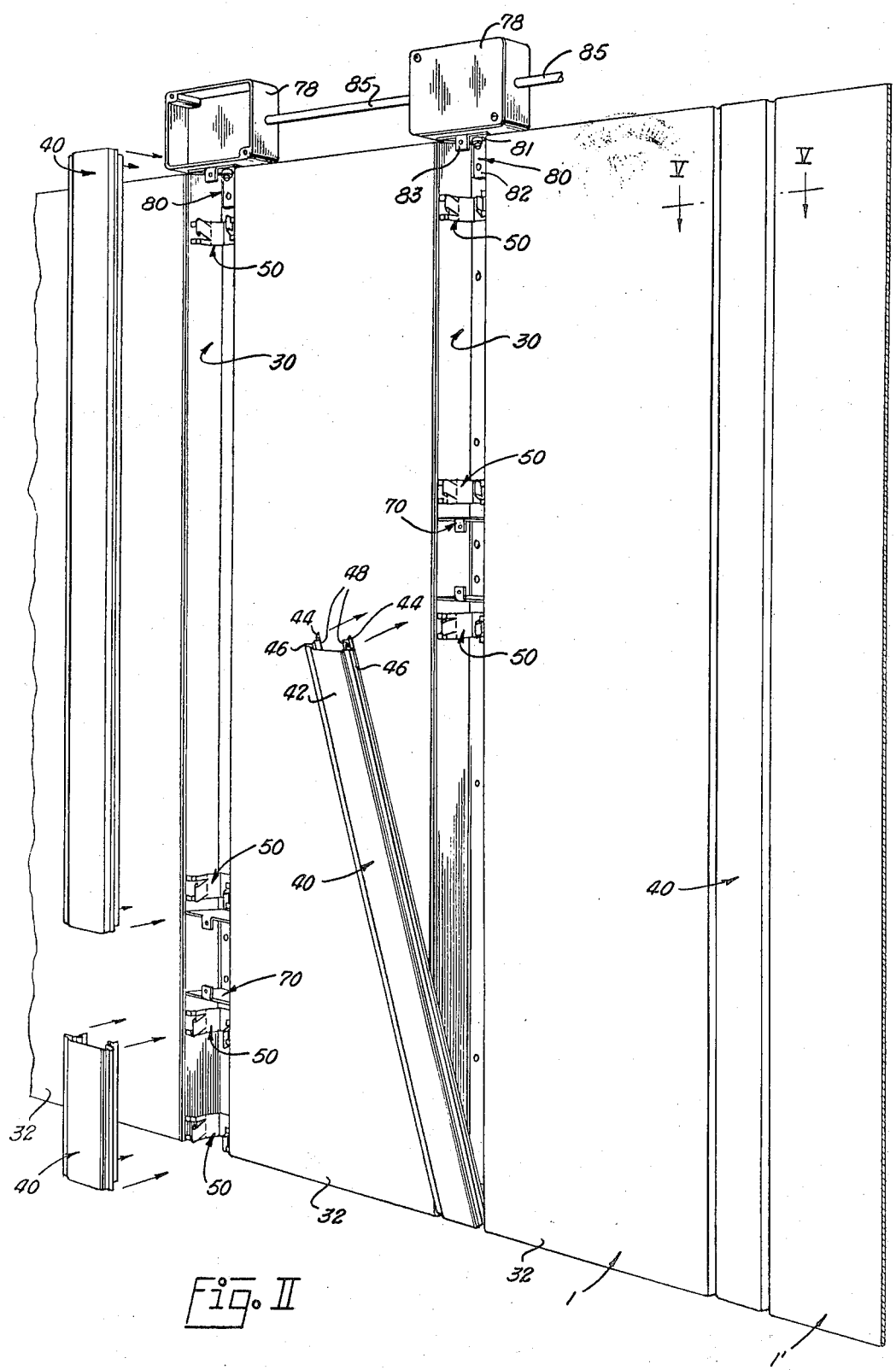

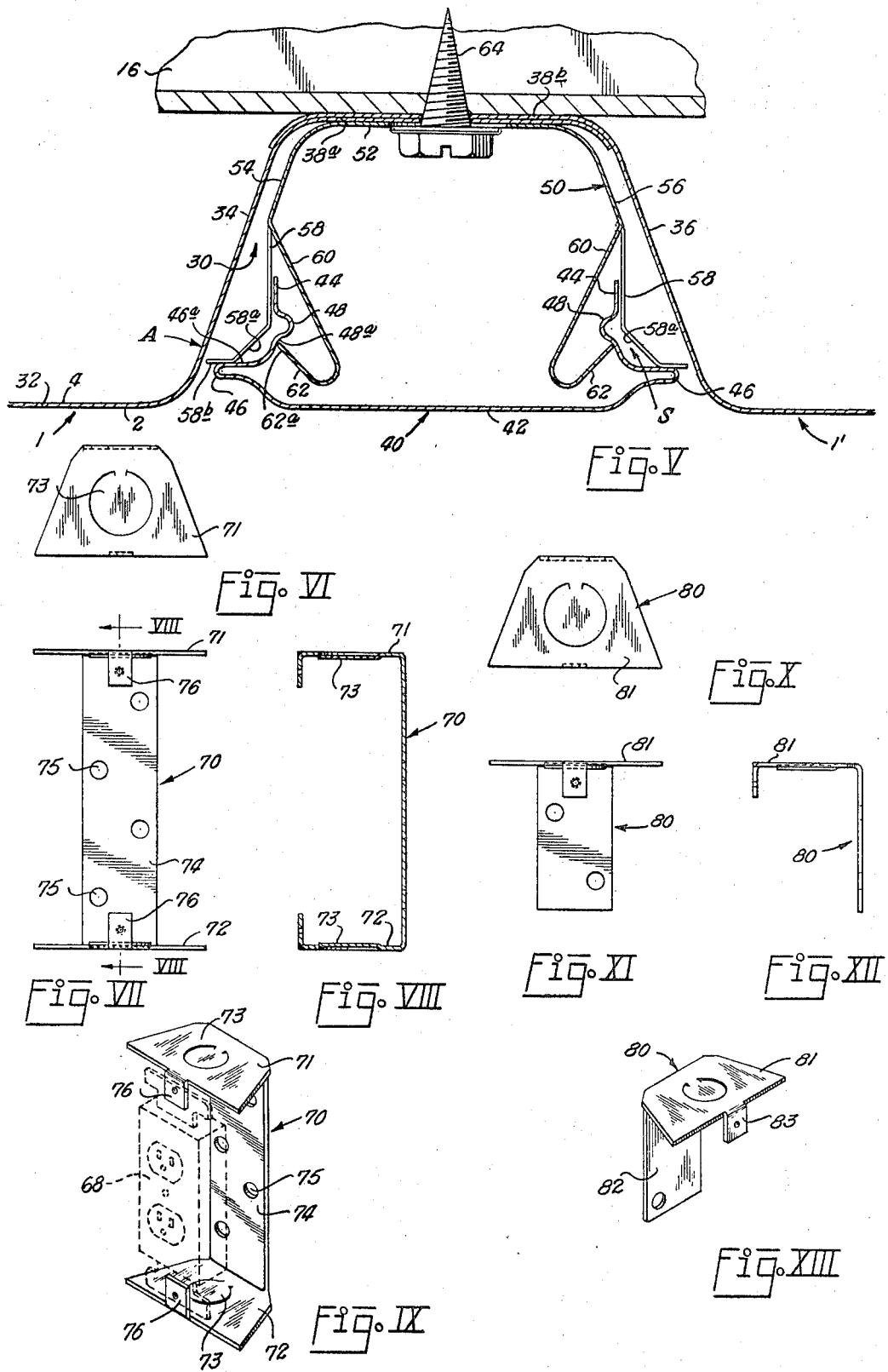

ELECTRICAL CONNECTOR FOR INTERIOR WALL PANELS

BACKGROUND OF INVENTION

Prefabricated metal buildings are widely used for offices, retail stores, manufacturing plants, agricultural buildings, warehouses and aircraft hangars.

Purchasers of such buildings generally select prefabricated columns, beams, roof assemblies, and interior and exterior wall panels which are constructed at a central plant permitting erection of the building at the building site by assembling the prefabricated components.

The cost of erecting prefabricated metal buildings is less than the cost of erecting buildings by conventional on-site building techniques to provide a building of comparable size and life expectancy.

Heretofore one of the major disadvantages of using prefabricated metal buildings for housing offices and manufacturing facilities has resulted from a lack of flexibility of the structure regarding installation of electrical switches and outlets in interior wall panels.

Heretofore openings were cut in the panel to accommodate junction boxes for light switches and electrical outlets. After the original installation of the electrical appliances, light switches and outlet boxes could not be readily moved to other locations on the wall panel without encountering substantial difficulty. Holes previously formed in the panels remained therein which presented an unsightly appearance.

SUMMARY OF INVENTION

We have devised an improved interior wall panel construction comprising sheet material having spaced hollow channels formed therein, said channels, for example two inches wide, have flat portions of the sheet, for example eight inches wide, extending therebetween. A filler strip having a width substantially equal to that of the channel is disconnectably secured by clips over the channel to provide a substantially smooth surface.

Brackets are mounted in the channel for supporting electrical switches and outlet sockets such that electrical wiring connected thereto extends through the channel formed in the panel. Clips are secured to the channel adjacent opposite ends thereof and adjacent opposite sides of each switch or electrial outlet. Filler strips are connected over portions of the channel unoccupied by electrical switches or outlets.

The primary object of the invention is to provide an interior wall panel construction having electrical connectors connectable thereto at virtually any desired location on the panel without any permanent modification of the wall panel.

Another object of the invention is to provide an interior panel for buildings having electrical connectors connectable in spaced channels formed in the wall panel such that electrical connectors may be removed from one channel and installed in another channel without appreciably changing the appearance of the wall panel.

A still further object of the invention is to provide an interior wall panel comprising a sheet having a plurality of equally spaced channels extending longitudinally thereof and having filler strips detachably secured over selected portions of each channel permitting prefabrication of a standard wall panel in which electrical outlets may be expeditiously installed at any desired location.

Other and further objects of the invention will become apparent upon referring to the detailed description hereinafter following and the drawings annexed hereto.

DESCRIPTION OF DRAWINGS

Drawings of a preferred embodiment of our invention are annexed hereto so that the invention may be better and more fully understood, in which:

FIG. 1 is a fragmentary cross-sectional view through a building having the improved interior wall panel mounted therein;

FIG. II is an exploded fragmentary perspective view of a wall panel;

FIG. III is an enlarged fragmentary perspective view of a wall panel and filler strip connectable thereto;

FIG. IV is an enlarged perspective view of a filler strip clip;

FIG. V is an enlarged cross-sectional view taken substantially along line V—V of FIG. II;

FIG. VI is a plan view of a switch box;

FIG. VII is a front elevational view of the switch box;

FIG. VIII is a cross-sectional view taken substantially along lines VIII—VIII of FIG. VII;

FIG. IX is a perspective view of a switch box;

FIG. X is a plan view of a junction box bracket;

FIG. XI is a front elevational view of a junction box bracket;

FIG. XII is a side elevational view of a junction box bracket; and

FIG. XIII is a perspective view of a junction box bracket.

Numeral references are employed to designate like parts throughout the various figures of the drawings.

DESCRIPTION OF A PREFERRED EMBODIMENT

Referring to FIGS. I and II of the drawing, the numeral 1 generally designates an interior wall panel having a face or front surface 2 and a back or soffit 4.

Interior wall panel 1 is secured to suitable support means which in the particular embodiment illustrated in the drawing comprises a concrete foundation slab 6 having suitable columns 8 extending upwardly therefrom and having a suitable roof structure secured thereover. The roof structure comprises spaced beams 10 to which roof deck 12 is secured. The roof deck preferably comprises steel panel sections secured in a shingle fashion to create a water shed, gaskets or water sealing compounds being used to seal between panels to prevent water leakage.

Eave struts 14 and girts 16 are secured between columns 8 and have exterior wall panels 18 secured thereto by suitable means such as bolts.

A base angle 20 is secured by suitable means such as anchor bolts 22 to the foundation slab 6 and extends between columns 8.

As best illustrated in FIG. I, column 8, girt 16 and the upwardly extending leg 24 of base angle 20 preferably have surfaces lying in a common vertical plane.

As best illustrated in FIGS. II and III, interior wall panels 1 comprise a unitary sheet of suitable material such as galvanized steel, aluminized steel, aluminum, or suitable thermoplastic materials such as acrylonitrile-butadiene-styrene (ABS).

The sheet comprising wall panel 1 may be formed by any suitable process including die forming of flat sheets or extrusion molding processes.

Each of the sheets has a plurality of spaced channels 30 formed therein between substantially flat portions 32 of the sheet.

Each channel 30 comprises sides 34 and 36 joined by back portion 38. Sides 34 and 36 are angularly disposed relative to flat portions 32 of the sheet, preferably at an angle of indicated at A in FIG. V of approximately 70°.

As best illustrated in FIG. V edges of panels 1 and 1' are preferably joined by overlapping back portions 38a and 38b adjacent edges of panels 1 and 1' and securing same together by suitable fasteners such as a screw. Overlapping portions 38a and 38b are preferably disposed such that the connection will be covered by a filler strip positioned thereover as will be hereinafter more fully explained.

An elongated filler strip 40 is detachably secured to bridge each channel 30 in each panel 1 and 1'.

Each filler strip 40 comprises a substantially flat central portion 42 having a projection 44 secured to opposite edges thereof by resilient U-shaped portion 46. Each projection 44 has a rib 48 protruding outwardly therefrom arranged to be urged into interengaging relation with gripper means as will be hereinafter more fully explained.

As best illustrated in FIG. II filler strip clips 50 are secured in each channel 30 adjacent upper and lower ends thereof and are secured adjacent opposite sides of each switch box 70, as will be hereinafter more fully explained, for detachably securing filler strips 40 over channels 30 while leaving the switch box accessible.

As best illustrated in FIG. IV each filler strip clip 50 comprises a substantially U-shaped element comprising a central portion 52 having slitted extremities 54 and 56 to form spaced ears 58 and a deflected leg 60 therebetween.

Each ear 58 has a camming surface 58a angularly disposed thereto arranged for guiding projection 44 on filler strip 40 toward the position illustrated in FIG. V when urged thereagainst. A stop element 58b extends outwardly from each camming surface 58a to engage the U-shaped portion 46 on filler strip 40 thus limiting movement of projection 44.

Legs 60 on clip 50 extend inwardly and have deflected portions 62 on the ends thereof substantially perpendicularly disposed to camming surfaces 58a on ears 58. As best illustrated in FIG. V it should be readily apparent that the deflected guide surfaces 62 on legs 60 and camming surfaces 58a are arranged to form a V-shaped guide slot S such that movement of projection 44 into the slot S will guide the edge of projection 44 toward the apex of the slot. Further movement of projection 44 urges legs 60 away from ears 58 permitting movement of rib 48 through the opening adjacent the apex of the guide slot. Movement of rib 48 past the end 62a of guide surface 62 permits the resilient leg 60 to swing back to the position illustrated in FIG. V securely gripping protrusion 48.

It should further be appreciated that the edge 62a of guide surface 62 engages the rear surface 48a of rib 48 while the surface 46a on the U-shaped portion 46 of filler strip 40 is in engagement with stop element 58b on leg 58 to prevent any vibration of filler strip 40 as a result of vibration of panels 1 resulting from the presence of machinery in the building or changes in air pressure such as often results when low flying aircraft pass in the vicinity of a building.

Clip 50 is preferably constructed of a suitable material, such as 20 gauge galvanized steel, having sufficient resilience to firmly grip projection 44 of filler strip 40 such that a minimum force of, for example, ten pounds as required to disengage projection 44 and rib 48 on filler strip 40 from between ears 58 and leg 60 of clip 50.

Clip 50 has an aperture 50a extending through a central portion 52 thereof through which suitable connector means such as screw 64 extends for securing clip 50 to the back portion 38 of groove 30.

As best illustrated in FIGS. I and II switches 66 and electrical outlet receptacles 68 are mounted at any desired elevation in channels 30 formed in wall panels 1.

Switch box clips 70, best illustrated in FIGS. II and VI–IX, comprise upper and lower flanges 71 and 72 shaped to correspond to the cross-sectional configuration of channel 30. Each flange 71 and 72 has a knockout plug 73 thereon closing an aperture through which electrical wires extend. Connector 74 has apertures 75 extending therethrough and has opposite ends secured to flanges 71 and 72. Flanges 71 and 72 have lugs 76 secured thereto to which a conventional electrical outlet receptacle 68 is connectable as best illustrated in FIG. IX by suitable means such as screws.

As best illustrated in FIGS. I and II a junction box 78 is secured to flange 81 of junction box clip 80. As best illustrated in FIGS. X–XIII junction box clip 80 has a downwardly extending leg 82 secured adjacent one side of flange 81 and a downwardly extending leg 83 secured to the other side thereof. Clip 80 is secured to the back portion 38 of groove 30 by suitable means such as screws.

From the foregoing it should be readily apparent that switch box clips 70 may be expeditiously connected at any desired location in any of the channels 30. Electrical wiring 85 is connected to each junction box 78. Wires 87 from junction box 78 extend through channel 30 to switches or outlet receptacles secured to clips 70.

Unless an electrical outlet or switch is to be installed in a specific channel 30 the filler strip 40 covering same will preferably extend along the entire length of the channel 30 and will be secured thereover by filler strip clips 50. As hereinbefore described, switch box clips 70 may be secured at any desired location along the length of selected channels 30 for installation of electrical outlets or switches, in which case sections of filler strips 40 preferably extend along channel 30 and are connected thereto by filler strip clips 50 above and below each switch box clip 70.

The protective covers 67 and 69, over switches 66 and outlet receptacles, and surfaces 42 of filler strips 40, and surfaces 32 on panels 1 preferably approximate a vertical plane.

From the foregoing it should be readily apparent that the preferred embodiment of our invention accomplishes the objects of the invention hereinbefore discussed. However, it should be readily apparent that other and further forms of the invention may be devised without departing from the basic concept thereof.

Having described our invention we claim:

1. A wall comprising, support means; a sheet having deflected portions forming spaced hollow channels connected by substantially flat portions of the sheet; means securing said sheet to said support means; clips having gripper means thereon; means securing said clips in said hollow channel; elongated filler strips having projections thereon engaged by said gripper means detachably securing said filler strip to said sheet such that each filler strip bridges a channel, each of said filler strips having a length less than the length of the channel; an electrical outlet receptacle; means securing said receptacle in at least one of said channels between adjacent ends of said filler strips such that surfaces of the flat portion of the sheet, the filler strip, and receptacle lie substantially in a common plane; and means extending through said channel to connect the receptacle to a source of electricity.

2. The combination called for in claim 1 wherein each clip comprises a substantially U-shaped member; and means securing the gripper means to extremities of said U-shaped member.

3. The combination called for in claim 1 wherein each clip comprises a curved deformable member having outwardly projecting extremities, said extremities being slotted forming spaced ears and a deflected leg between said ears, said ears and leg being adapted to engage opposite sides of the projection on the filler strip.

4. The combination called for in claim 1 wherein the filler strip comprises a channel shaped member having flange-like projections adjacent opposite edges thereof; and a protrusion on each of said projections engaged by said gripper means.

5. The combination called for in claim 4 wherein each clip comprises a curved member having slotted extremities forming spaced ears having outwardly inclined cam surfaces thereon and having an inwardly deflected leg having a guide surface thereon disposed substantially perpendicular to the cam surface on the ears, said ears and leg being adapted to guide the projection on the filler strip therebetween and to grippingly engage opposite sides of said projection.

6. The combination called for in claim 1 wherein the means securing an electrical receptacle comprises a channel-shaped member having inwardly projecting lugs; and means to secure the receptacle to the lugs.

7. A wall comprising, support means; a sheet having spaced channels formed therein; a filler strip; projections adjacent edges of the filler strip; means securing the sheet to the support means; curved members; means securing the curved members in the channels adjacent opposite ends of the channels; an outwardly deflected ear on each side of each of said curved members; a guide surface on each of said ears; an inwardly deflected leg on each side of each of said curved members adjacent said ears; a cam surface on each of said legs, said guide surface and said cam surface forming a V-shaped guide slot adjacent opposite sides of said curved member such that each projection on the filler strip is guided into gripped relation between an ear and a leg.

8. The combination called for in claim 7 with the addition of a rib on each of said projections, and wherein a surface on said leg is positioned against said rib resiliently urging surfaces on the filler strip toward surfaces on the ears.

* * * * *